(12) United States Patent
Fujii et al.

(10) Patent No.: US 7,203,493 B2
(45) Date of Patent: Apr. 10, 2007

(54) WIRELESS COMMUNICATION SYSTEM

(75) Inventors: Kenichi Fujii, Tokyo (JP); Shigeru Hiroki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 10/032,249

(22) Filed: Dec. 21, 2001

(65) Prior Publication Data

US 2002/0082011 A1    Jun. 27, 2002

(30) Foreign Application Priority Data

Dec. 27, 2000 (JP) ............................ 2000-399018
Apr. 13, 2001 (JP) ............................ 2001-115393

(51) Int. Cl.
*H04Q 7/20* (2006.01)
*H04Q 7/38* (2006.01)

(52) U.S. Cl. ..................... 455/434; 455/500; 455/502; 455/422.1; 455/67.11; 455/423; 455/425; 455/424; 370/508; 370/503; 370/498

(58) Field of Classification Search ................ 455/434, 455/422.1, 403, 500, 502, 517, 550.1, 426.1, 455/414.1, 561, 404.1, 404.2, 435.1, 435.2, 455/435.3, 426.2, 445, 458, 567, 67.11, 423, 455/424, 425, 67.12, 67.14; 370/508, 503, 370/304, 324, 350, 512

See application file for complete search history.

(56) References Cited

U.S. PATENT DOCUMENTS

| | | | | |
|---|---|---|---|---|
| 5,241,598 A | * | 8/1993 | Raith | ........................ 380/248 |
| 5,280,541 A | * | 1/1994 | Marko et al. | ............... 455/462 |
| 5,594,944 A | | 1/1997 | Ogata et al. | |
| 5,613,220 A | | 3/1997 | Arai | |
| 5,642,400 A | | 6/1997 | Arai et al. | |
| 5,771,457 A | | 6/1998 | Tsutsui | |
| 5,940,756 A | * | 8/1999 | Sibecas et al. | ........... 455/426.1 |
| 5,969,629 A | | 10/1999 | Tsuchida | |
| 5,999,809 A | | 12/1999 | Watanabe | |
| 6,085,070 A | | 7/2000 | Watanabe | |
| 6,094,563 A | | 7/2000 | Kakizawa | |

(Continued)

FOREIGN PATENT DOCUMENTS

EP        0 734 193        9/1996

(Continued)

OTHER PUBLICATIONS

English Language text of paragraphs [0030] to [0034] of JP11-041658.

(Continued)

*Primary Examiner*—Keith Ferguson
(74) *Attorney, Agent, or Firm*—Morgan & Finnegan, LLP

(57) ABSTRACT

A call in request is transmitted from a wireless base station to a wireless communication terminal apparatus when there is a call in from a service center. If the wireless communication terminal apparatus does not respond, the wireless base station is reset and, after the reset is completed, a call in request is transmitted to the wireless communication terminal apparatus again. In addition, if out of standby occurs, the wireless communication terminal apparatus notifies the wireless base station to that effect and the wireless base station changes a forward pattern of a notification signal.

7 Claims, 13 Drawing Sheets

U.S. PATENT DOCUMENTS

| | | | |
|---|---|---|---|
| 6,144,852 A | 11/2000 | Orosz | 455/423 |
| 6,215,782 B1 * | 4/2001 | Buskens et al. | 370/350 |
| 6,229,985 B1 | 5/2001 | Arai | |
| 6,233,463 B1 * | 5/2001 | Wiedeman et al. | 455/552.1 |
| 6,243,583 B1 | 6/2001 | Tsutsui et al. | |
| 6,370,111 B1 * | 4/2002 | Takeda et al. | 370/216 |
| 6,477,183 B1 * | 11/2002 | Yamamoto | 370/508 |
| 6,584,316 B1 * | 6/2003 | Akhteruzzaman et al. | 455/445 |
| 6,631,142 B2 * | 10/2003 | Miyamoto et al. | 370/508 |
| 2001/0021650 A1 * | 9/2001 | Bilgic | 455/418 |
| 2004/0176129 A1 * | 9/2004 | Menon et al. | 455/554.1 |

FOREIGN PATENT DOCUMENTS

| | | |
|---|---|---|
| GB | 2 268 366 | 1/1994 |
| JP | 04-057592 | 4/1992 |
| JP | 63-50514 | 12/1994 |
| JP | 08-294165 | 11/1996 |
| JP | 09-218253 | 8/1997 |
| JP | 11-041658 | 2/1999 |
| JP | 11-275659 | 11/1999 |
| JP | 2000-028991 | 1/2000 |
| JP | 2000-069198 | 3/2000 |
| JP | 2000-333235 | 11/2000 |

OTHER PUBLICATIONS

English language text of paragraph [0020] of JP2000-333235.

* cited by examiner

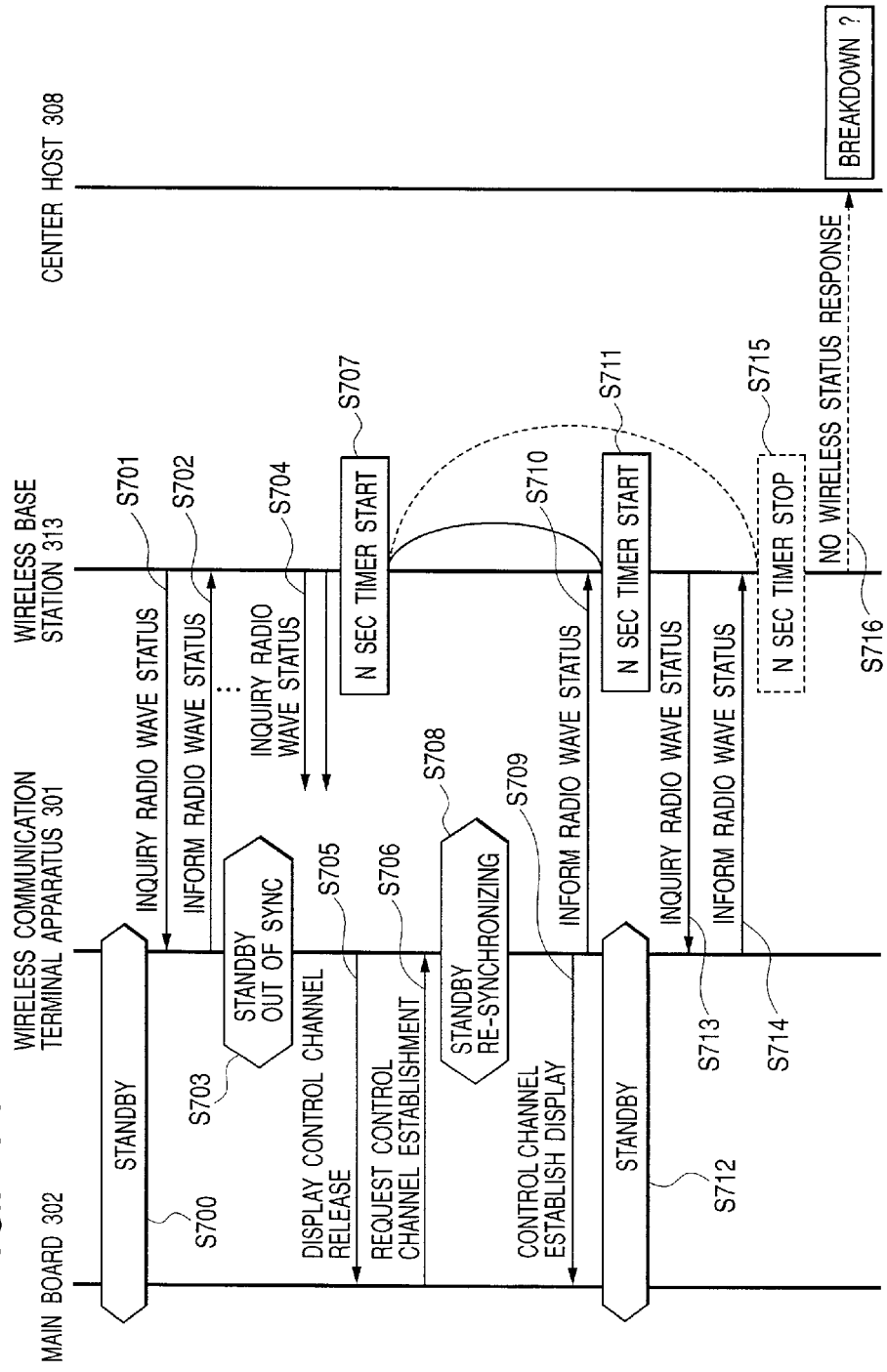

WIRELESS COMMUNICATION SYSTEM

BACKGROUND OF THE INVENTION

1. Field of the Invention

The present invention relates to a wireless communication system consisting of a wireless communication apparatus and a wireless communication control apparatus.

2. Related Background Art

In a wireless communication system such as a PHS (Personal Handy Phone System), while a wireless communication terminal apparatus is on standby in a wireless base station of its own system, it may be out of an area of the wireless base station due to its movement. In order to cope with the wireless communication terminal apparatus being out of an area due to its movement, various management processing technologies have been proposed (e.g., Japanese Patent Application Laid-open Nos. 9-218253 and 8-294165).

In addition, in a case where various wireless communication systems mixedly exist in a floor where OA apparatuses are installed, for example, a plurality of wireless base stations exist in extensions of a PXB (Private Branch Exchange), a collision occurs between control signals transmitted by the wireless base stations, with the result that a wireless communication terminal apparatus on standby and its wireless base station become out of synchronization.

Thus, if a situation arose in which a wireless communication terminal apparatus was not able to receive a call in when there actually was the call in, it is unclear whether this was due to a failure of the wireless communication terminal apparatus or because the wireless communication terminal apparatus was out of synchronization and happened to fail to receive the call in, which results in a problem.

FIG. 1 illustrates a configuration of a conventional wireless communication system. Out of synchronization at the time of processing standby in the conventional art will be described with reference to this figure.

In FIG. 1, reference numeral 900 denotes a management unit (management apparatus) that is connected to wireless base stations 902a, 902b and 902c, which cover networks (A) 901a, (B) 901b and (C) 901c, respectively, as its area. Reference numeral 903 denotes a wireless communication terminal apparatus connected to an OA apparatus 909. In addition, the management unit 900 is connected to a management center 907 via a public network 906 and can be operated and maintained remotely from a host computer 908.

Reference numeral 904 denotes a Private Branch Exchange (PBX) in which PBX wireless base stations 905a, 905b, 905c and 905d exist. In addition, it is assumed that the wireless communication terminal apparatus 903 is currently on standby in the wireless base station 902a.

Next, processing of out of standby in the conventional wireless communication system consisting of the above-mentioned configuration will be described with reference to a sequence chart of FIG. 2.

The wireless communication terminal apparatus 903 is currently on standby in the wireless base station 902a (S1000). Although the OA apparatus 909 which is a maintenance object apparatus is fixedly installed, notification signals that are steadily transmitted among the wireless base station 902a on standby and the other wireless base stations collide with each other, whereby synchronization of standby becomes out of order (S1001). The wireless communication terminal apparatus 903 transmits a control channel release display indicating that synchronization is out of order to the main OA apparatus 909 (S1002). Upon receiving it, the OA apparatus 909 transmits a control channel establishment request for causing the wireless communication terminal apparatus 903 and the wireless base station 902a to take synchronization again (S1003) and establishes resynchronization of standby (S1006).

If there is a call in from the management center 907 until the resynchronization of standby is established (S1004, S1005), since the wireless communication terminal apparatus 903 is out of synchronization, it cannot respond to the call in.

Further, in FIG. 2, step S1007 indicates a control channel establish display to be transmitted from the wireless communication terminal apparatus 903 to the OA apparatus 909, step S1008 indicates a call in NG to be transmitted from the wireless base station 902a to the management center host 908 and step S1009 indicates standby.

However, according to the above-mentioned conventional art, it is unclear whether the wireless communication terminal apparatus 903 was out of synchronization of standby with the wireless base station 902a that is performing a standby operation or failed due to a trouble. Moreover, depending on an environment in which a wireless communication system is installed (a situation in which a plurality of wireless base stations exist and collisions among wireless state notification signals occur frequently), out of synchronization of standby occurs frequently and a wireless communication terminal apparatus cannot easily respond to a call in, whereby a possibility of loss of the call in increases.

SUMMARY OF THE INVENTION

The present invention has been devised in view of solving the problems of the above-mentioned conventional art, and it is an object of the present invention to provide a wireless communication system that is capable of returning to a normal state early from a state in which wireless communication between a communication control apparatus and a communication apparatus is out of order.

In addition, it is another object of the present invention to provide a wireless communication system that is capable of rapidly avoiding interference even if timing for transmitting a control signal of a master set of the wireless communication system and timing for transmitting a control signal of master sets of the other wireless system overlap and interfere with each other.

In addition, it is another object of the present invention to provide a wireless communication system that is capable of immediately recovering from failure even if a call in occurs during a standby recovery operation and the call in is failed.

Other objects of the present invention will be apparent from the following descriptions taken in conjunction with the accompanying drawings.

BRIEF DESCRIPTION OF THE DRAWINGS

FIG. 14 is a sequence chart showing operations of a wireless communication system in accordance with a fourth embodiment of the present invention.

DETAILED DESCRIPTION OF THE PREFERRED EMBODIMENTS

Preferred embodiments of the present invention will be hereinafter described with reference to drawings.

First, a first embodiment of the present invention will be described.

Figure 1:
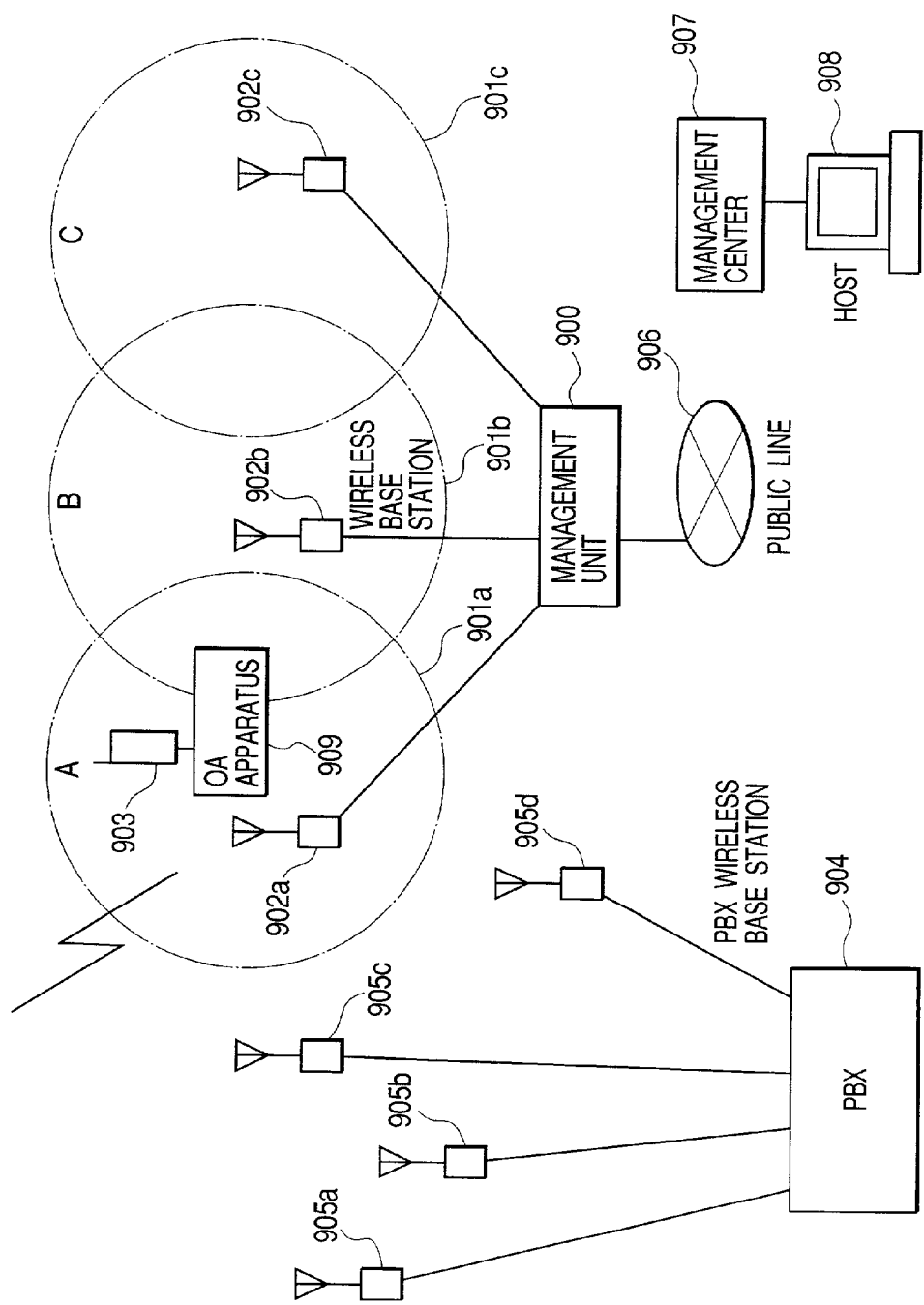
FIG. 1 illustrates a configuration of a conventional wireless communication system.
Figure 2:
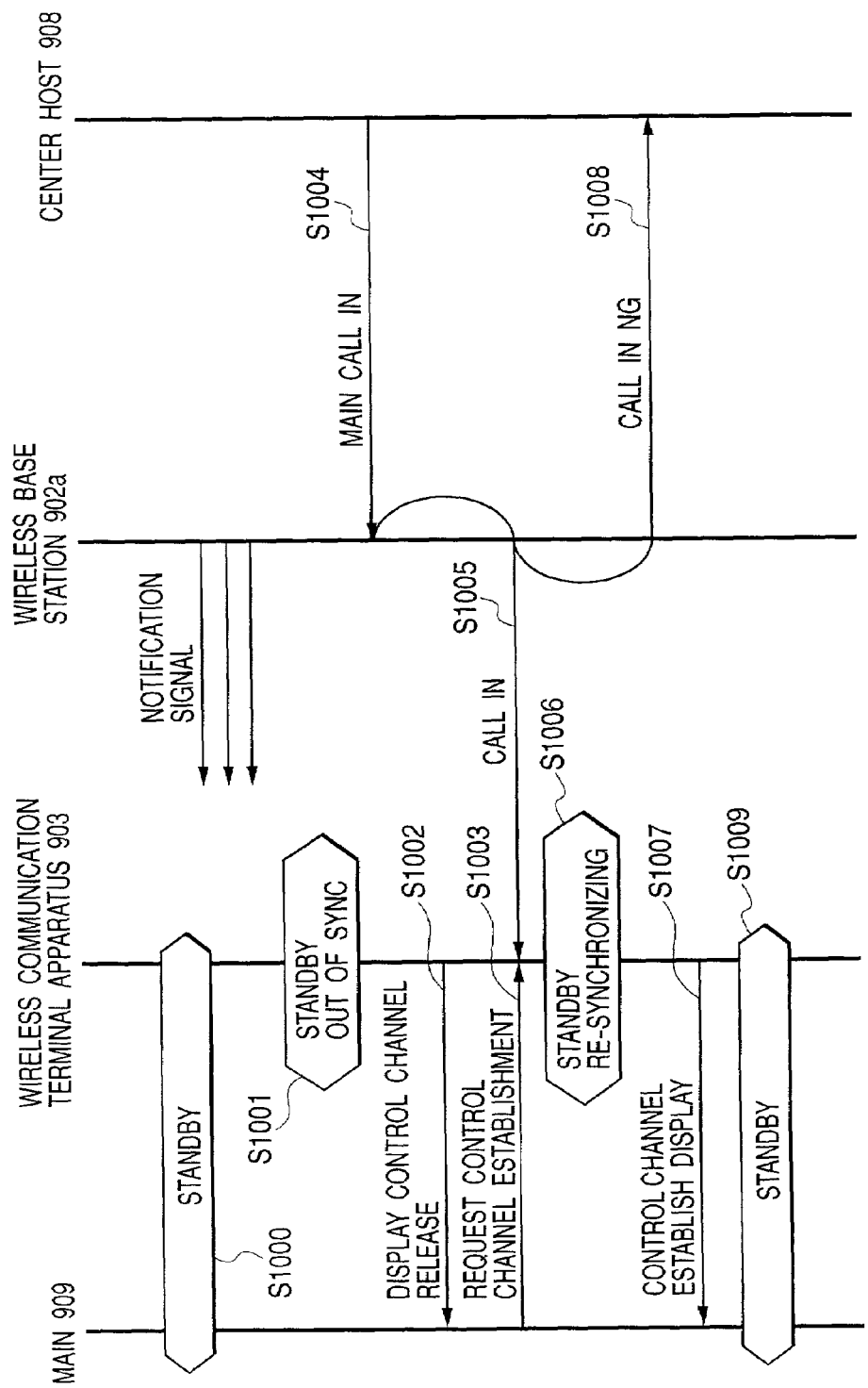
FIG. 2 is a sequence chart showing operations of the conventional wireless communication system.
Figure 3:
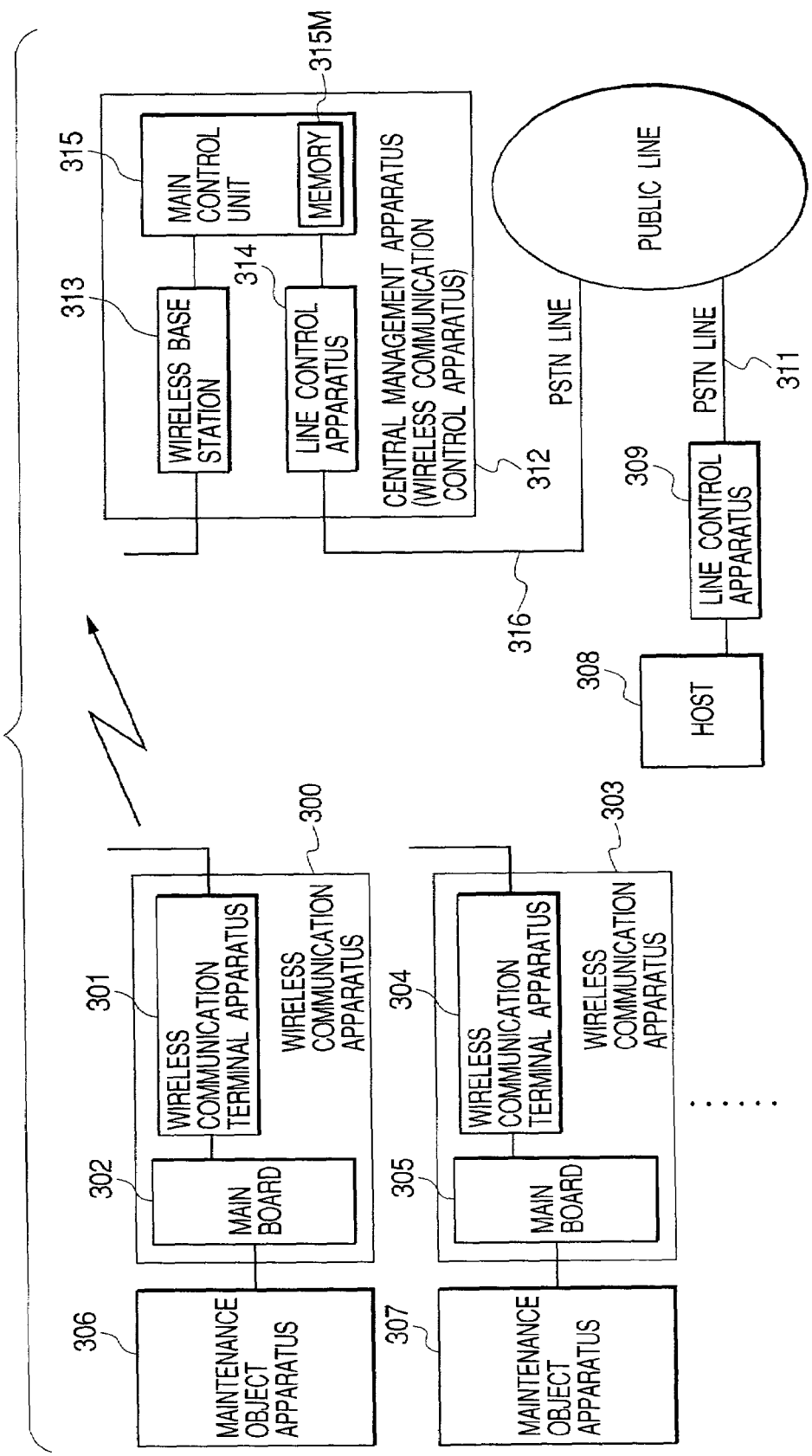
FIG. 3 is a block diagram showing a configuration of an entire wireless communication system in accordance with a first embodiment of the present invention.

FIG. 3 is a block diagram showing a configuration of an entire wireless communication system in accordance with this embodiment.

In the figure, reference numeral 300 denotes a first wireless communication apparatus that consists of a wireless communication terminal apparatus 301 and a main board 302 connected with each other. Reference numeral 303 denotes a second wireless communication apparatus that consists of a wireless communication terminal apparatus 304 and a main board 305 connected with each other. Reference numeral 306 denotes a first maintenance object apparatus that is connected to the main board 302 of the first wireless communication apparatus 300. Reference numeral 307 denotes a second maintenance object apparatus that is connected to the main board 305 of the second wireless communication apparatus 303. The first and the second maintenance object apparatuses 306 and 307 are, for example, copying machines, printers or complex machines having a printer function and a scanner function.

Reference numeral 308 denotes a host (host computer) installed in a place remote from the maintenance object apparatuses 306 and 307, 309 denotes a line control apparatus and 310 denotes a public network. The line control apparatus 309 connects the host 308 and the public network 310 via a PSTN line 311.

Reference numeral 312 denotes a central management apparatus (wireless communication control apparatus) that includes a wireless base station 313, a line control apparatus 314 and a main control unit 315. The wireless base station 313 and the line control apparatus 314 are connected to the main control unit 315. The central management apparatus 312 is connected to the host 308 via a PSTN line 316, the public network 310, the PSTN line 311 and the line control apparatus 309. The main control unit 315 has a memory 315M.

The wireless base station 313 has, for example, a base station function of a private mode of a PHS (personal handy phone system).

In addition, the wireless communication terminal apparatuses 301 and 304 are, for example, PHS slave sets that make connection to the wireless base station 313 wirelessly.

Figure 4:
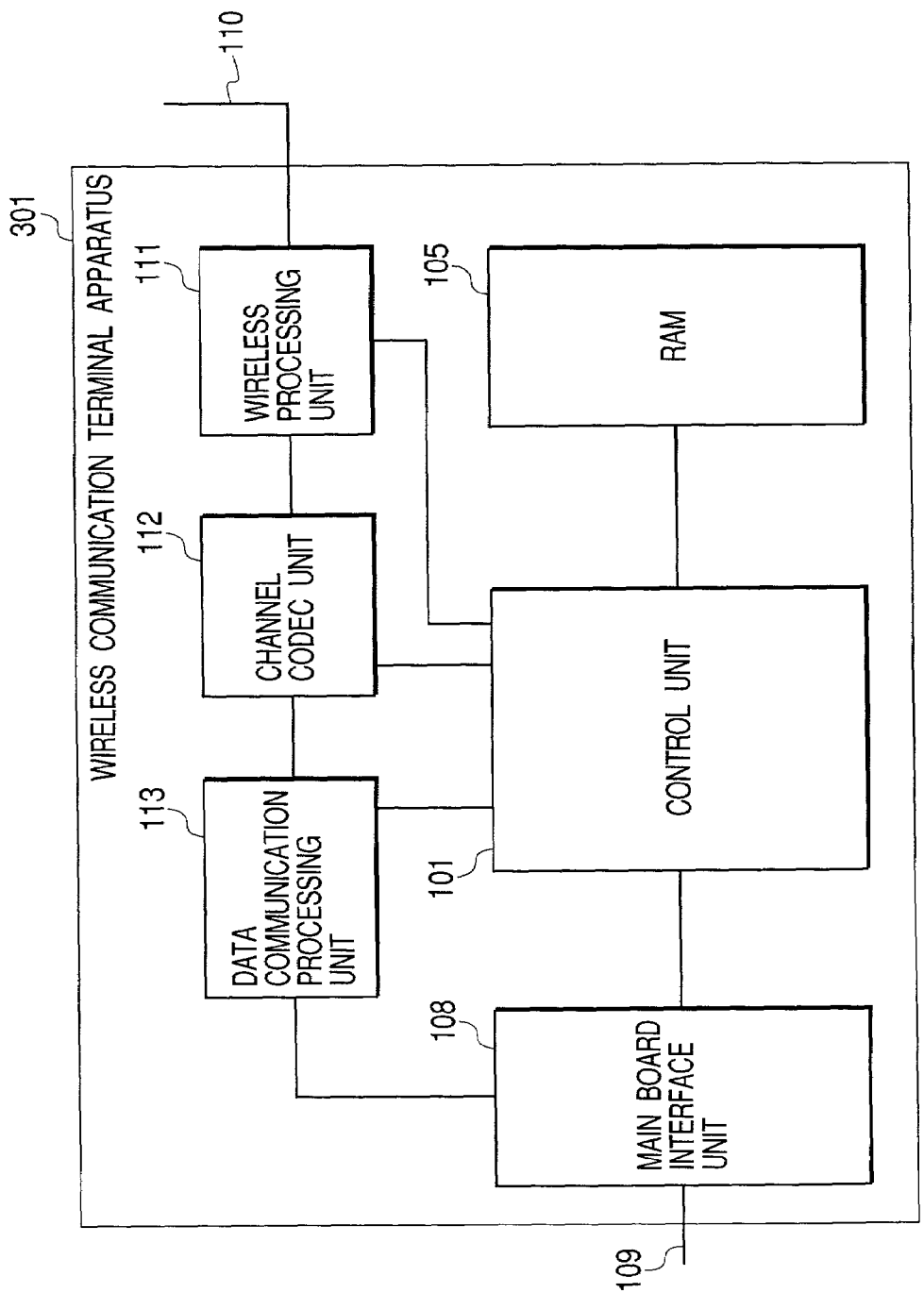
FIG. 4 is a block diagram showing a configuration of a wireless communication terminal apparatus in the wireless communication system in accordance with the first embodiment of the present invention.

FIG. 4 is a block diagram showing a configuration of the wireless communication terminal apparatus 301. Further, the wireless terminal apparatus 304 has the same configuration.

In the figure, reference numeral 101 denotes a control unit. reference numeral 105 denotes a RAM (random access memory), 108 denotes a main board interface unit, 109 denotes a connecting portion with the main board 302, 110 denotes an antenna, 111 denotes a wireless processing unit (RF), 112 denotes a channel codec unit and 113 denotes a data communication processing unit.

Figure 5:
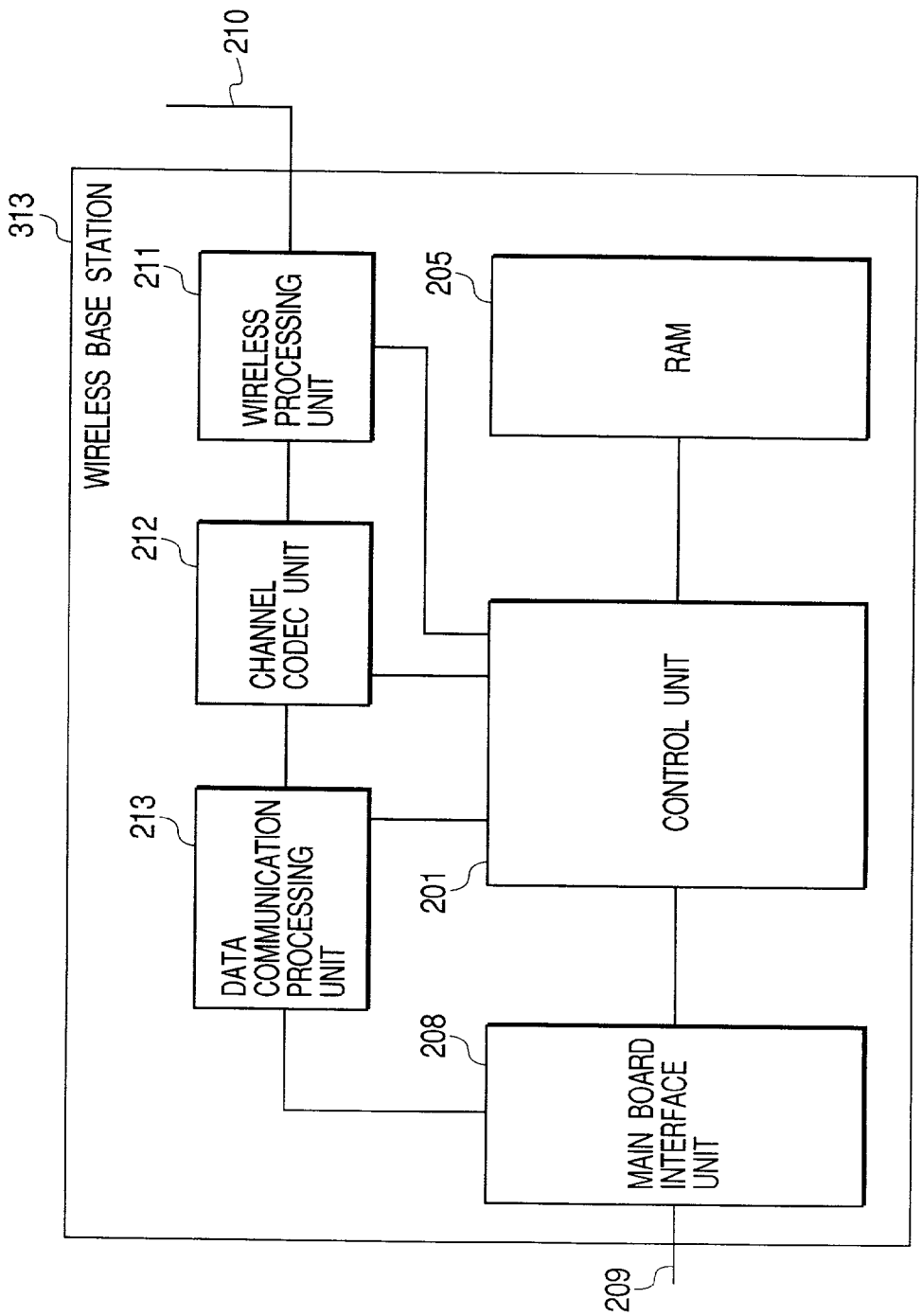
FIG. 5 is a block diagram showing a configuration of a wireless base station in the wireless communication system in accordance with the first embodiment of the present invention.

FIG. 5 is a block diagram showing a configuration of the wireless base station 313.

In the figure, reference numeral 201 denotes a control unit that has functions of call in control and the like. Reference numeral 205 denotes a RAM (random access memory), 208 denotes a main board interface unit, 209 denotes a connecting portion with the main control unit 315, 210 denotes an antenna, 211 denotes a wireless processing unit (RF), 212 denotes a channel codec unit and 213 denotes a data communication processing unit.

The wireless base station 313 intermittently transmits a control signal for a time period of 625 microseconds once in several seconds to several hundreds of milliseconds. The wireless communication terminal apparatus 301 keeps a communication zone standby state by intermittently receiving the control signal.

Next, the first embodiment of the present invention will be further described.

Figure 6:
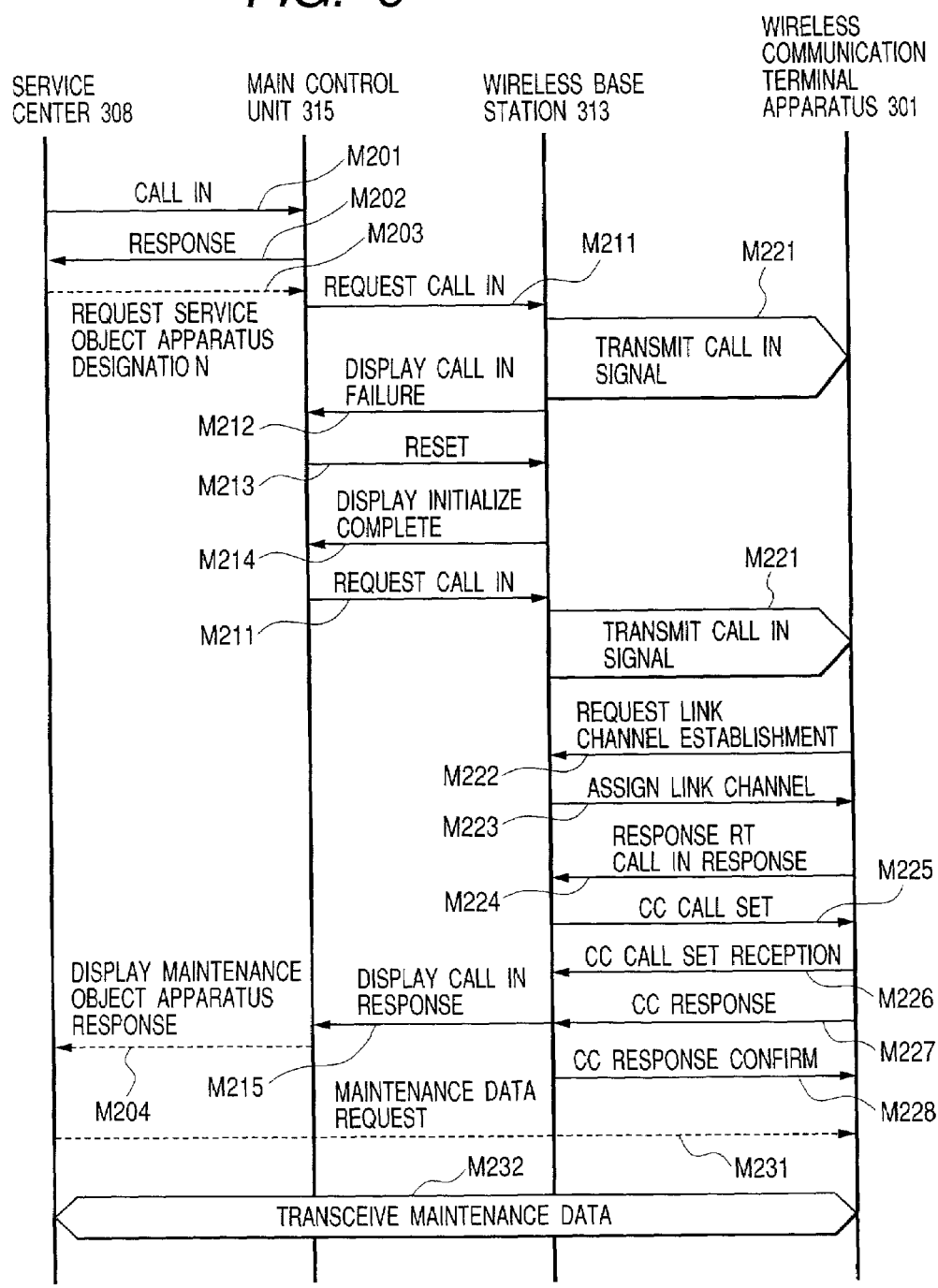
FIG. 6 is a sequence chart showing operations of the wireless communication system in accordance with the first embodiment of the present invention.

FIG. 6 is a sequence chart among the host 308 in the service center, the main control unit 315 of the central management apparatus (wireless communication control apparatus) 312, the wireless base station 313 and the wireless communication terminal apparatus 301.

Figure 7:
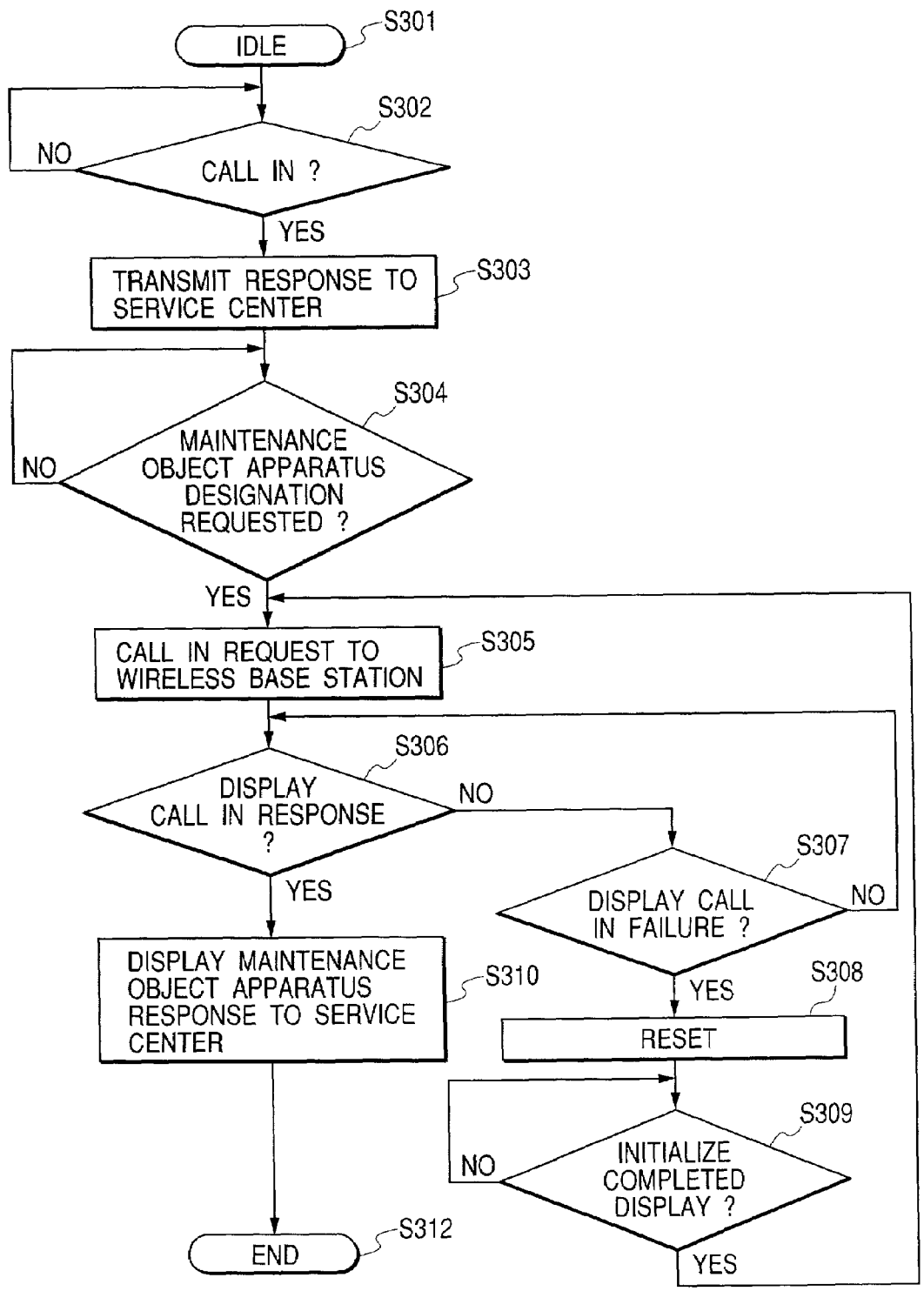
FIG. 7 is a flow chart showing operations of a main control unit of a central management apparatus (wireless communication control apparatus) in the wireless communication system in accordance with the first embodiment of the present invention.

FIG. 7 is a flow chart showing operations of the main control unit 315 of the central management apparatus (wireless communication control apparatus) 312 in accordance with the first embodiment of the present invention. The main control unit 315 is a computer incorporating the memory 315M and reads out and operates a program stored in the memory 315M. The memory 315M is a storage medium that stores the program in a computer-readable manner. The flow chart of FIG. 7 is included in this program.

The first embodiment of the present invention will be described along the sequence chart of FIG. 6 and the flow chart of FIG. 7.

When an operator of the maintenance host 308 in the service center requests data for maintenance of the maintenance object apparatus 306, the maintenance host 308 requests the line control apparatus 309 on the service center side to perform transmission designating a telephone number of the central management apparatus 312.

Upon receiving a request of transmission, the line control apparatus 309 on the service center side performs transmission to the central management apparatus 312 via the telephone line network 310.

Upon detecting a call in M201 from the telephone line network 310 via the line control apparatus 314 of the central management apparatus (S302) in an idle state (S301), the central management apparatus 312 transmits a response M202 to the telephone line network 310 via the line control apparatus 314 of the central management apparatus (S303).

Upon detecting the response, the line control apparatus 309 on the service center side notifies the maintenance host 308 of the response of the central management apparatus 312. At this point, a telephone line is connected between the line control apparatus 309 on the service center side and the line control apparatus 314 on the central management apparatus side, whereby transmission and reception of data become possible between the maintenance host 308 and the main control unit 315 of the central management apparatus 312.

The maintenance host 308 transmits a request service object apparatus designation M203 designating the maintenance object apparatus 306 to the central management apparatus 312.

Upon receiving the request service object apparatus designation M203 (S304), the main control unit 315 of the central management apparatus transmits a call in request M211 designating the maintenance object apparatus 306 to the wireless base station 313 (S305). This call in request M211 is included in a control signal intermittently transmitted from the wireless base station 313 to the wireless communication terminal apparatus 301 to be communicated from the wireless base station 313 to the wireless communication terminal apparatus 301.

Upon receiving the call in request M211, the wireless base station 313 transmits a call in signal M221 designating an extension number of the wireless communication terminal apparatus 301 to be connected to the maintenance object apparatus 306.

At this point, if the control signal interferes with a control signal of a base station (e.g., a master set of a PHS of a private mode) of another wireless communication system, the wireless communication terminal apparatus 301 cannot receive the call in signal M221 and cannot transmit a response message responding to the call in signal M221.

If an RT call in response message M224 is not received within a fixed period of time (four seconds in a standard RCR STD-28 of a PHS) after the call in signal M221 is transmitted, the wireless base station 313 communicates a call in failure display M212 to the main control unit 315 of the central management apparatus. The main control unit 315 of the central management apparatus (wireless communication control apparatus) detects that wireless communication between the wireless base station 313 and the wireless communication terminal apparatus 301 is out of order according to this call in failure display M212.

Upon receiving the call in failure display M212 (S307), the main control unit 315 of the central management apparatus transmits a reset signal M213 to the wireless base station 313 to reset the wireless base station 313 (S308).

Upon being reset, the wireless base station 313 performs initialize processing and, when the initialize processing is complete, communicates an initialize complete display M214 to the main control unit 315 of the central management apparatus. Upon receiving the initialize complete display (M214) (S309), the main control unit 315 of the central management apparatus transmits the call in request M211 designating the maintenance object apparatus 306 to the base station 313 again (S305).

Upon receiving the call in request M211, the wireless base station 313 transmits the call in signal M221 designating an extension number of the wireless communication terminal apparatus 301 to be connected to the maintenance object apparatus 306.

The wireless base station 313 transmits a control signal at timing corresponding to an input of the reset signal M213. That is, the main control unit 315 controls timing when the wireless base station 313 transmits a control signal according to this reset signal M213. Every time the wireless base station 313 is reset, timing for transmitting a control signal changes and a possibility of avoiding interference with other master sets is increased. In FIG. 6, after the wireless base station 313 is reset, a case in which it has become possible for the wireless communication terminal apparatus 301 to receive a control signal from the wireless base station 313 is described.

Upon receiving the call in signal M221 designating an extension number of its own station, the wireless communication terminal apparatus 301 transmits a link channel establish request message M222 to the wireless base station 313.

Upon receiving the link channel establish request message M222, the wireless base station 313 searches a communication channel that can be used in communication and, when the communication channel is found, transmits a link channel assignment message M223 to the wireless communication terminal apparatus 301, thereby informing a communication channel to be used in communication.

Upon receiving the link channel assignment message M223, the wireless communication terminal apparatus 301 shifts to the designated communication channel and transmits an RT call in response message M224 responding to the call in signal M221 to the wireless base station 313. Upon receiving the RT call in response message M224, the wireless base station 313 transmits a CC call set message M225 to the wireless communication terminal apparatus 301.

Upon receiving the CC call set message M225, the wireless communication terminal apparatus 301 transmits a CC call set reception message M226 and a CC response message M227 to the wireless base station 301.

Upon receiving the CC response message M227, the wireless base station 313 transmits a CC response confirm message M228 to the wireless communication terminal apparatus 301 and communicates the call in response display M215 to the main control unit 315 of the central management apparatus.

Upon receiving the call in response display M215 (S306), the main control unit 315 of the central management apparatus transmits a maintenance object apparatus response display M204 to the maintenance host 308 via the line control apparatus 314 of the central management apparatus (S310).

When the maintenance host 308 receives the maintenance object apparatus response display M204 and the wireless communication terminal apparatus 301 receives the CC response confirm message M228, transmission and reception of data become possible between the maintenance host 308 and the maintenance object apparatus 107A. The maintenance computer 109 transmits a maintenance data request M231 to the maintenance object apparatus 306, whereby transmission and reception of maintenance data M232 are performed.

Even if the wireless communication terminal apparatus 301 cannot return the call in response message M224 when the call in signal M221 is transmitted for the second time, repeating this operation allows the wireless communication terminal apparatus 301 to return the call in response message M224 almost surely.

Therefore, even if the wireless communication terminal apparatus 301 is out of a communication zone due to collision of control signals in the case in which a cordless telephone set or a private cordless system that uses a private mode of a PHS is installed besides this remote maintenance system, maintenance data can be obtained surely without providing an expensive or complicated apparatus.

In the embodiment shown in FIGS. 6 and 7, the main control unit 315 of the central management apparatus waits for the initialize complete display M214 to be communicated from the wireless base station 313 after the wireless base station 313 is reset and, then, transmits the call in request M211 to a PHS control unit 102 of the central management apparatus again. However, in other embodiments, the main control unit 315 of the central management apparatus waits for the wireless base station 313 to be reset for a sufficient period of time after the wireless base station 313 is reset and, then, transmits the call in request M211 to the wireless base station 313.

In addition, in the other embodiments, if the call in failure display M212 is received from the wireless base station 313, the main control unit 315 of the central management apparatus re-transmits the call in request M211 once without resetting the wireless base station 313 and resets the wireless base station 313 upon receiving the call in failure display M212 again.

In addition, in the other embodiments, if the wireless base station 313 is reset, it monitors control signals of the other wireless systems and transmits a control signal (call in signal M221, etc.) at timing when the control signal does not collide with the control signals of the other wireless systems. In addition, in the other embodiments, if the PHS control unit 102 is reset, it transmits a maintenance object apparatus call in failure display to the service center 308 without re-transmitting the call in request M211 when the control signals of the other wireless communication systems are not received.

In addition, in the other embodiments, if the call in failure display M212 is received even if the call in request M211 is transmitted for a predetermined number of times, a maintenance object apparatus call in failure display is transmitted to the service center 108.

Next, a second embodiment of the present invention will be described with reference to FIG. 8.

Further, since a basic configuration of a wireless communication system in accordance with this embodiment is the same as that of the above-mentioned first embodiment shown in FIGS. 3 to 5, its description is omitted.

This embodiment is intended for coping with a case in which collision of wireless notification signals occurs frequently among wireless base stations when different wireless communication systems coexist.

Figure 8:
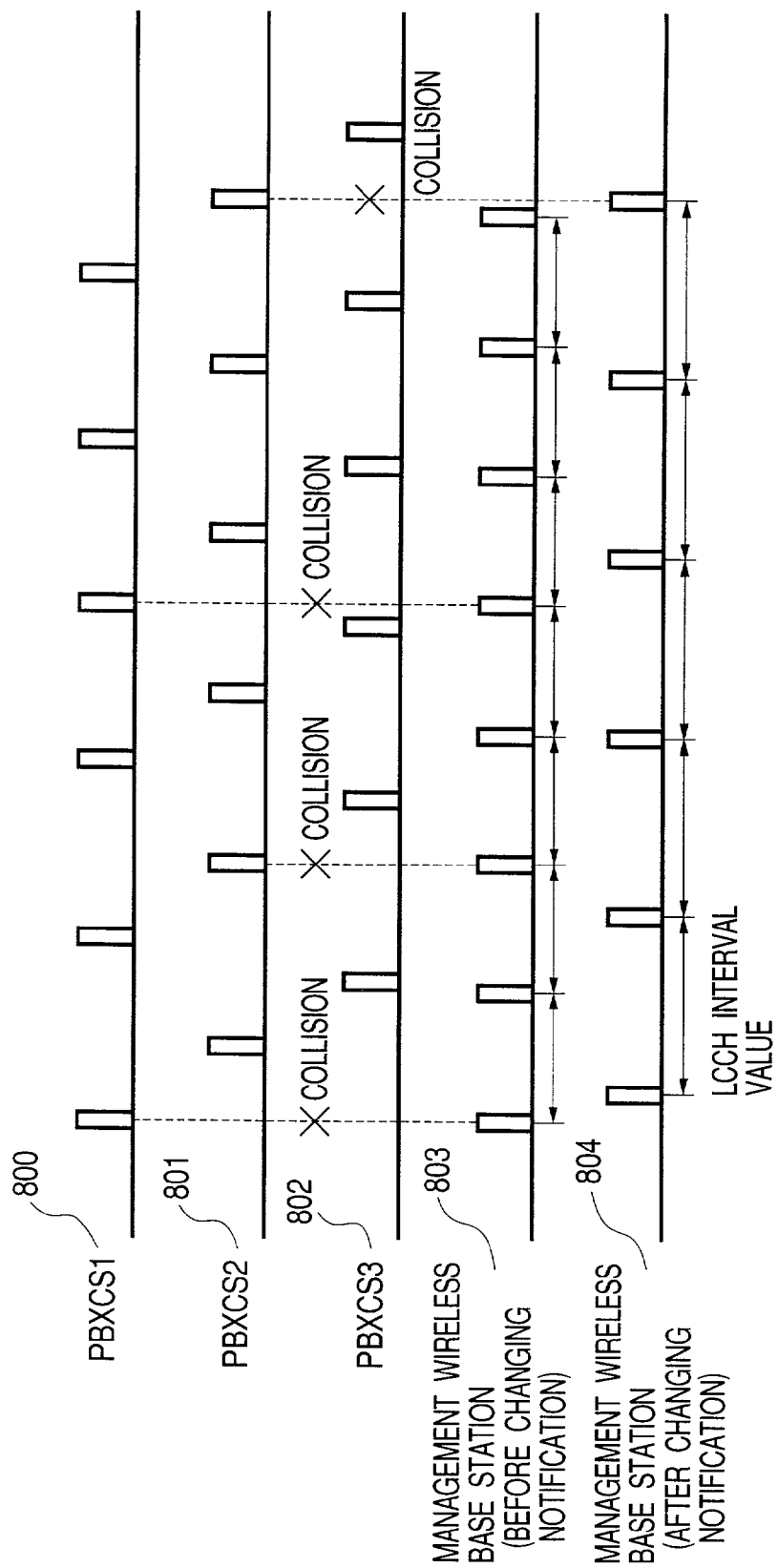
FIG. 8 is a timing chart showing collisions of wireless state notification signals in a wireless communication system in accordance with a second embodiment of the present invention.

FIG. 8 illustrates an example of the case in which collision of wireless notification signals occurs frequently among wireless base stations when different wireless communication systems coexist. In FIG. 8, reference numeral 803 denotes a transmission pattern of a notification signal from the wireless base station 301 before changing the notification, 804 denotes a transmission pattern of a notification signal from the wireless base station 301 after changing the notification and 800, 801 and 802 are transmission patterns of notification signals from PBXCSs 1, 2 and 3 that are wireless base stations other than the wireless base station 301, respectively.

In the case as shown in FIG. 8, a transmission pattern of a wireless notification signal that is steadily transmitted from a wireless base station and includes a transmission pattern or the like of a base station, that is, an LCCH interval value is changed, whereby collision of wireless notification signals among wireless base stations can be prevented from occurring.

In order to realize this, an area for storing (per a unit time) a frequency of out of standby (out of synchronization) is provided in the RAM 105 of the wireless communication terminal apparatus 301 and wireless notification signal patterns 1, 2 and 3 are stored in the RAM 205 of the wireless base station 313.

Figure 9:
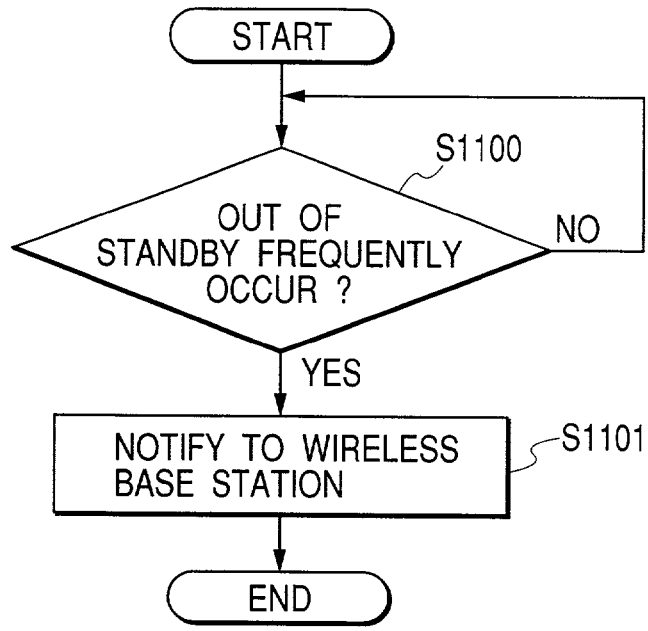
FIG. 9 is a flow chart showing operations of a wireless communication terminal apparatus in the wireless communication system in accordance with the second embodiment of the present invention.
Figure 10:
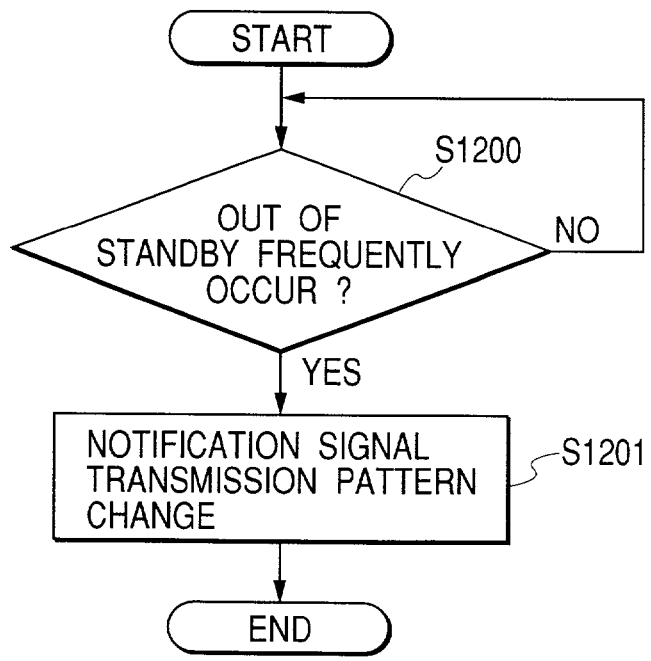
FIG. 10 is a flow chart showing operations of a wireless base station in the wireless communication system in accordance with the second embodiment of the present invention.

Operations of the wireless communication terminal apparatus 301 and the wireless base station 313 will be described with reference to FIGS. 9 and 10. These operations are realized by the control units 101 and 201 controlling each unit of the wireless communication terminal apparatus 301 and the wireless base station 313. The control units 101 and 201 perform this control based on programs stored in the RAMs 105 and 205. The control units 101 and 201 are composed of computers and the RAMs 105 and 205 are storage mediums in which the programs are stored such that the control units 101 and 201 can read them out.

When an out of standby frequency exceeds a predetermined threshold value (S1100), the wireless communication terminal apparatus 301 notifies the wireless base station 301 to that effect (S1101). That is, the wireless communication terminal apparatus 301 detects that wireless communication between the wireless communication terminal apparatus 301 and the wireless base station 313 is out of order if the out of standby frequency has exceeded the predetermined threshold value.

On the other hand, upon receiving the notification to the effect that the out of standby frequency of the wireless communication terminal apparatus 301 has exceeded the threshold value (S1200), the wireless base station 301 changes one of the above-mentioned patterns (S1201). That is, the wireless base station 301 changes timing for transmitting a notification signal that is a control signal. Notifying that the out of standby frequency has exceeded the threshold value is equivalent to requesting change of timing for transmitting a notification signal to the wireless base station 313.

By the above-mentioned processing operations, it becomes possible to reduce occurrence of collision of notification signals among wireless base stations, whereby power consumption of a battery required for resynchronization on the wireless communication terminal apparatus side becomes unnecessary.

Figure 11:
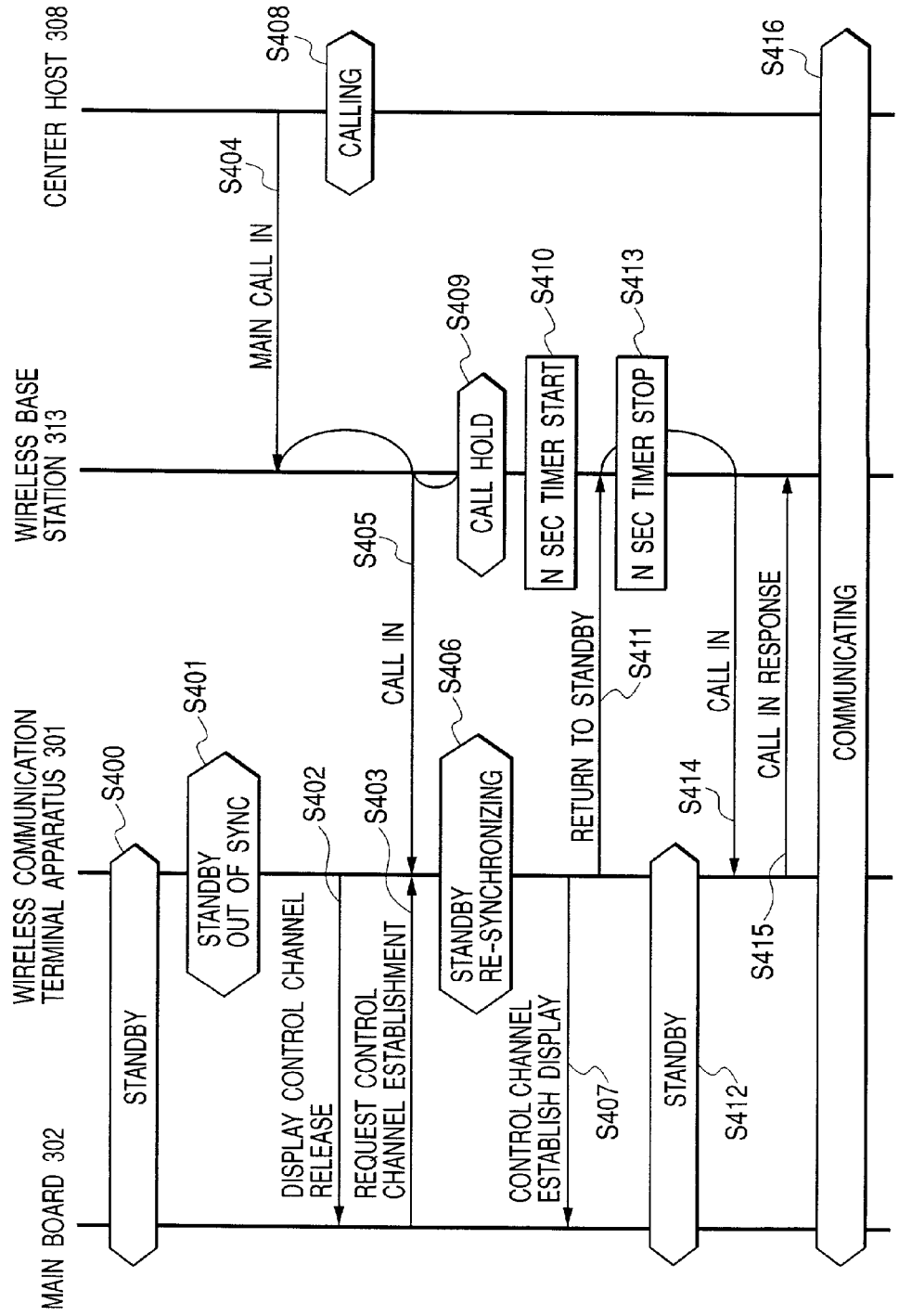
FIG. 11 is a sequence chart showing operations of a wireless communication system in accordance with a third embodiment of the present invention.

Next, connection control operations between the wireless communication terminal apparatus 301 and the wireless base station 313 in the case in which out of standby occurs in the wireless communication terminal apparatus 301 and there is a call in from the wireless base station 313 during resynchronization in a wireless communication system in accordance with a third embodiment of the present invention will be described with reference to a sequence chart of FIG. 11. Further, since a basic configuration of the wireless communication system in accordance with this embodiment is identical with that of the above-mentioned first embodiment shown in FIGS. 3 to 5, its description are omitted. Here, a case in which only the wireless communication terminal apparatus 301 is registered in the wireless base station 313 will be described.

First, it is assumed that out of synchronization of standby occurs (S401) while the wireless communication terminal apparatus 310 is on standby for a call in signal from the wireless base station 313 (S400). This out of synchronization of standby is a state in which a notification signal from the wireless base station 301 cannot be received. In this case, the wireless communication terminal apparatus 301 transmits a control channel release display signal to the main board 302 (S402) and, after receiving a control channel establish request signal from the main board 302 (S403), activates resynchronization processing of standby again (S406). This resynchronization processing of standby is processing for synchronizing receiving timing of the wireless processing unit 111 with timing when the wireless base station 313 transmits a notification signal.

At this time, a call in is generated from the host (center host) 308 (S404), the host 308 is in calling (S408) and the wireless base station 313 transmits a call in signal to the wireless communication terminal apparatus 301 (S405).

However, since the wireless communication terminal apparatus 301 is re-synchronizing a standby operation, it cannot receive the call in signal from the wireless base station 313 to respond to it. At this point, that is, when a response signal from the wireless communication terminal apparatus 301 is not received, the wireless base station 313 performs a call hold operation (S409) and starts an N second timer for a time period during which the call hold operation is activated (S410).

By the time when the N second timer is up, the wireless communication terminal apparatus 301 establishes resynchronization of standby and, after transmitting a control channel establish display signal to the main 302 (S407), transmits a return to standby signal to the wireless base station 313 (S411). Then, the wireless communication terminal apparatus 301 is in standby for a call in signal from the wireless base station 313 (S412).

Upon receiving the return to standby signal from the wireless communication terminal apparatus 301, the wireless base station 313 stops the above-mentioned N second timer (S413), restarts the call in that is on hold and transmits a call in signal to the wireless communication terminal apparatus 301 (S414). That is, the wireless base station 313 transmits a call in signal at timing in response to receipt of the return to standby signal.

The wireless communication terminal apparatus 301 responds to the call in this time (S415), and communication is established between the host 308 and the main 302 via the wireless base station 313 (S416).

Next, operations of the wireless communication terminal apparatus 301 and the wireless base station 313 in the case in which synchronization of standby is out of order in the wireless communication system in accordance with this embodiment will be described. Note that, operations of the wireless communication terminal apparatus 304 are the same as those of the wireless communication terminal apparatus 310.

First, operations of the wireless communication terminal apparatus 301 will be described with reference to FIG. 12. These operations are realized by the control unit 101 controlling each unit of the wireless communication terminal apparatus 301. The control unit 101 performs this control based on a program stored in the RAM 105. The control unit 101 is composed of a computer and the RAM 105 is a storage medium storing this program such that the control unit 101 can read it out.

Figure 12:
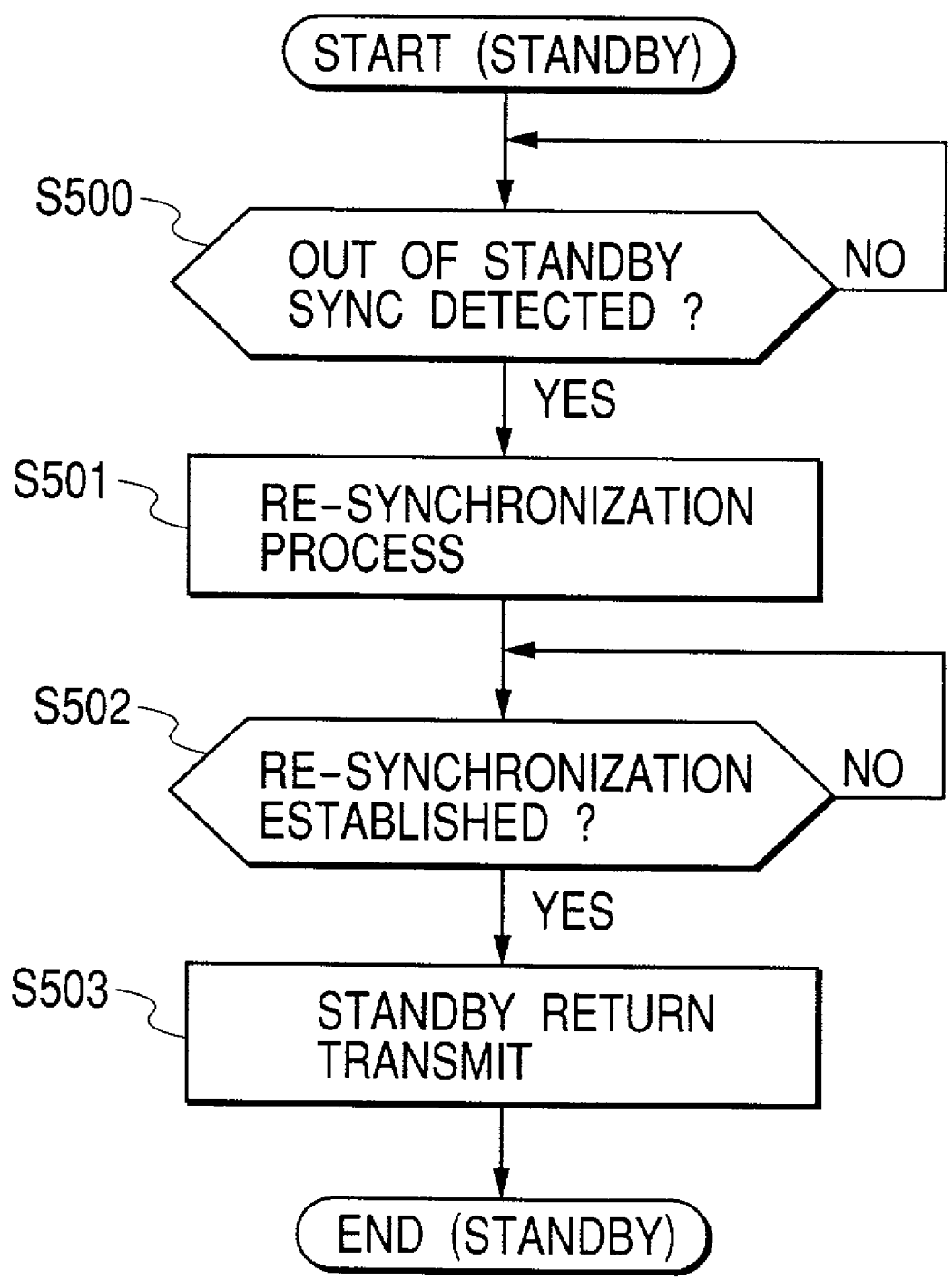
FIG. 12 is a flow chart showing operations of a wireless communication terminal apparatus in the wireless communication system in accordance with the third embodiment of the present invention.

In FIG. 12, the wireless communication terminal apparatus 301 first detects out of synchronization of standby during standby (S500). The control unit 101 determines that out of synchronization of standby has occurred if a notification signal from the base station 201 is not received.

Then, if out of synchronization of standby is detected, the wireless communication terminal apparatus 301 transmits a control channel release display signal to the main board 302 (S402) and, after receiving a control channel establish request signal from the main board 302 (S403), immediately performs resynchronization establish processing (S501). This resynchronization processing of standby is processing for synchronizing receiving timing of the wireless processing unit 111 with timing when the wireless base station 313 transmits a notification signal.

After resynchronization is established (S502), the wireless communication terminal apparatus 301 transmits the control channel establish display signal to the main board 302 and, after transmitting a return to standby signal to the wireless base station 313 (S503), ends the processing operations to return to the standby state again. In this standby state, it is possible to receive a call in signal from the wireless base station 313.

Next, operations of the wireless base station 313 will be described with reference to FIG. 13. These operations are realized by the control unit 201 controlling each unit of the wireless base station 313. The control unit 201 performs this control based on a program stored in the RAM 205. The control unit 201 is composed of a computer and the RAM 205 is a storage medium storing this program such that the control unit 201 can read it out.

Figure 13:
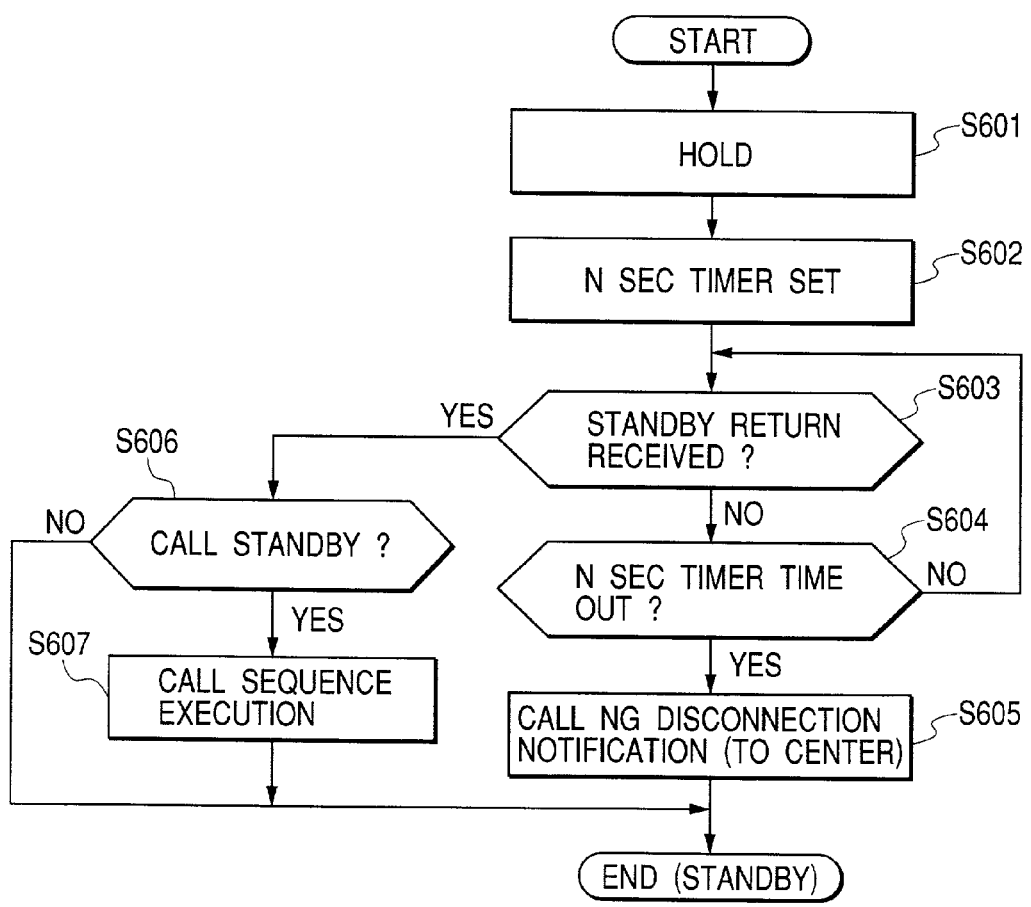
FIG. 13 is a flow chart showing operations of a wireless base station in the wireless communication system in accordance with the third embodiment of the present invention.

The wireless base station 313 transmits a call in signal to the wireless communication terminal apparatus 301 and, if there is no response to the call in signal, enters the processing of FIG. 13, temporarily holds a call in (S601) and sets an N second timer representing the holding time (S602). Next, the wireless base station 313 checks receipt of a return to standby signal from the wireless communication terminal apparatus 301 in order to find out if synchronization is established (S603).

Then, if resynchronization is established, the wireless base station 313 checks whether or not there is the above-mentioned held call in (S606) and, if there is no held call in, straightly ends these processing operations and returns to the standby state again. On the other hand, if there is a held call in, after executing a call in sequence such as restart of the held call in and transmission of a call in signal to the wireless communication terminal apparatus 301, the wireless base station 313 ends these processing operations and returns to the standby state again. That is, the wireless base station 313 transmits a call in signal at timing in response to receipt of a return to standby signal. Note that, if the center host 308 has already ended a call in when the return to standby signal is received, since there is no held call in, the wireless base station 313 advances the processing to the end of these processing operations based on the determination of NO in S606.

In addition, if resynchronization is not established in the above-mentioned step S603, the wireless base station 313 performs time out check of the N second timer that was activated before (S604). Then, if time out of the N second timer does not occur, the wireless base station 313 returns to the above-mentioned step S603. If time out of the N second timer occurs, the wireless base station 313 transmits a notification signal of disconnection due to call in NG to the host (center) 308 (S605), and then ends these processing operations to returns to be in the standby state again.

As described above, the wireless communication terminal apparatus 301 transmits a return to standby signal to the wireless base station 313 after it is out of synchronization of standby and establishes resynchronization. As a result, the wireless communication terminal apparatus 301 can notify the wireless base station 313 of return to standby and, even if there is a call in from the wireless base station 313 while it is establishing resynchronization, the wireless base station 313 keeps a timer of resynchronization standby and does not immediately determine that a call in is NG. Thus, the wireless base station 313 can recover a call in operation even if the wireless communication terminal apparatus 301 is out of synchronization due to some reason.

Although the above-mentioned third embodiment has been described with the case in which a return to standby signal is transmitted at the time of returning from standby as an example, a wireless state may be confirmed utilizing a position registration instead of a return to standby signal.

Next, a fourth embodiment of the present invention will be described with reference to FIG. 14.

Note that, a basic configuration of a wireless communication system in accordance with this embodiment is identical with that shown in FIGS. 3 to 5 in the above-mentioned first embodiment.

Operations of the wireless communication terminal apparatus 301 and the wireless base station 313 in the case in which the wireless communication system in accordance with this embodiment is out of synchronization of standby will be hereinafter described with reference to a flow chart of FIG. 14.

First, while the wireless communication terminal apparatus 301 is on standby for a call in signal from the wireless base station 313 (S700), the wireless base station 313 periodically transmits a wireless state inquiry signal to the wireless communication terminal apparatus 301 (S701). In response to the wireless state inquiry signal, the wireless communication terminal apparatus 301 transmits a wireless state inform signal to the wireless base station 313 (S702).

Then, when out of synchronization of standby occurs on the wireless communication terminal apparatus 301 side (S703), the wireless communication terminal apparatus 301 transmits a control channel release display signal to the main 302 (S705). The main 302 transmits a control channel establish request signal indicating a request for resynchronization to the wireless communication terminal apparatus 301 (S706). The wireless communication terminal apparatus 301 then performs resynchronization processing of standby (S708). Note that, out of synchronization of standby is a state in which a notification signal from the wireless base station 301 cannot be received. The resynchronization processing of standby is processing for causing receiving timing of the wireless processing unit 111 to synchronize with timing when the wireless base station 313 transmits a notification signal. Upon establishing resynchronization of standby, the wireless communication terminal apparatus 301 transmits a control channel establish display signal to the main 302 (S709).

As described above, the wireless base station 313 transmits a wireless state inquiry signal to the wireless communication terminal apparatus 301 (S704) even in a state until resynchronization of standby is completed after synchronization of standby is out of order. However, since a wireless state inform signal from the wireless communication terminal apparatus 301 is not transmitted to the wireless base station 313 (there is no response), the wireless base station 313 activates an N second timer for response standby (S707).

Upon successfully returning to the standby state again, the wireless communication terminal apparatus 301 transmits a wireless state inform signal to the wireless base station 313 (S710). Upon receiving this wireless state inform signal, the wireless base station 313 recognizes that it has returned to a normal standby operation and stops the N second timer (S711).

In this way, even in the state in which the wireless communication terminal apparatus 301 has returned to the standby state (S712), the wireless base station 313 transmits a wireless state inquiry signal to the wireless communication terminal apparatus 301 (S713). In response to the wireless state inquiry signal, the wireless communication terminal apparatus 301 transmits a wireless state inform signal to the wireless base station 313 (S714).

However, if a wireless state inform signal from the wireless communication terminal apparatus 301 is not transmitted to the wireless base station 313 even if the N second timer is time out (S715), that is, if a wireless state inform signal is not received at predetermined timing, the wireless base station 313 calls the host 308 via the public network 310. Then, the wireless base station 313 transmits a signal without wireless state response (inform) to the host (center host) 308 (S716), and the host 308 recognizes that some trouble has occurred on the maintenance object apparatus 306 side. Note that, this signal without wireless state response (inform) indicates that wireless communication between the wireless base station 313 and the wireless communication terminal apparatus 301 is out of order.

As described above, according to the wireless communication system in accordance with this embodiment, a wireless state is periodically confirmed between a wireless base station and a wireless communication terminal apparatus, whereby there is an effect unique to this embodiment is realized in which, even if some trouble occurs in the wireless communication terminal apparatus (including an OA apparatus), a host (center host) in a remote place can immediately detect the trouble and a prompt measure can be taken for a user.

Although the above-mentioned fourth embodiment has been described with the case in which a wireless state inform signal is transmitted at the time of returning from standby as an example, a wireless state may be confirmed utilizing a position registration instead of a wireless state inform signal.

Although a PHS (Personal Handy Phone System) is described as an example of the wireless communication system of the present invention in the above-mentioned each embodiment, the present invention is not limited to this and it is possible to obtain the same effect by other wireless communication methods such as PDC, GSM, DECT, IS95, CDMAone and W-CDMA.

In particular, the present invention is effective to other private mode wireless systems in which a master set intermittently transmits a control signal and a slave set is forced to be out of a communication zone by interference of a control signal with the other master sets.

In addition, although the telephone line network 111 is used as a public network in the above descriptions, other public networks such as the Internet may also be used.

Further, the present invention is not limited only to a system, an apparatus and a method for realizing the above-mentioned each embodiment, and various modifications are possible within the scope of claims. The present invention also covers the case in which a program code of software for realizing the above-mentioned each embodiment is supplied to a computer (CPU or MPU) in the above-mentioned system or apparatus, and the computer of the above-mentioned system or apparatus causes various devices to operate in accordance with this program code, thereby realizing the above-mentioned each embodiment.

In addition, in this case, the program code itself of the above-mentioned software realizes the function of the above-mentioned each embodiment. The present invention covers the program code itself and means for supplying the program code to the computer, more specifically a storage medium storing the above-mentioned program code.

As a storage medium storing such a program code, a hard disk, a floppy disk, an optical disk, a magneto-optical disk, a CD-R, a DVD, a magnetic tape, a nonvolatile memory card, a ROM, a CD-ROM and the like can be used.

In addition, the present invention covers such a program code not only in the case in which the above-mentioned computer controls various devices in accordance with only a supplied program code to realize the function of the above-mentioned each embodiment but also in the case in which the above-mentioned program code cooperates with an OS (Operating System) running on the computer, other application software or the like to realize the function of the above-mentioned each embodiment.

Moreover, the present invention also covers the case in which the supplied program code is stored in a memory provided in a function extended board of a computer or a function extended unit connected to the computer, and then a CPU or the like provided in the function extended board or the function extended unit performs a part or all of actual processing based on an instruction of the program code to realize the above-mentioned each embodiment.

What is claimed is:

1. A wireless communication system comprising
a base station; and
a wireless communication apparatus,
wherein the wireless communication system resets transmission timing for retransmitting of an incoming call signal transmitted from the base station and addressed to the wireless communication apparatus in a case where a response signal in response to the incoming call signal from the base station and addressed to the wireless communication apparatus is not received from the wireless communication apparatus.

2. A system according to claim 1, wherein the base station resets the transmission timing in a case where the response signal in response to the incoming call signal from the base station and addressed to the apparatus designated by an incoming call is not received.

3. A base station for controlling wireless communication with a wireless communication apparatus, comprising:
transmitting means for transmitting an incoming call signal addressed to the wireless communication apparatus; and
reset means for resetting transmission timing for retransmitting of the incoming call signal addressed to the wireless communication apparatus in a case where a response signal in response to the incoming call signal addressed to the wireless communication apparatus is not received from the wireless communication apparatus.

4. A base station according to claim 3, wherein the reset means is configured to reset transmission timing when the response signal in response to the incoming call signal addressed to the wireless communication apparatus designated by an incoming call is not received.

5. A computer program embodied in a computer readable medium for a base station comprising the programming steps of:
transmitting an incoming call signal addressed to the wireless communication apparatus; and
resetting transmission timing for retransmitting of the incoming call signal addressed to the wireless communication apparatus in a case where a response signal in response to the incoming call signal addressed to the wireless communication apparatus is not received from the wireless communication apparatus.

6. A method of transmitting an incoming call signal from a base station comprising:
transmitting an incoming call signal addressed to the wireless communication apparatus; and
resetting transmission timing for retransmitting of the incoming call signal addressed to the wireless communication apparatus in a case where a response signal in response to the incoming call signal addressed to the wireless communication apparatus is not received from the wireless communication apparatus.

7. A method according to claim 6, wherein in said resetting transmission timing, the retransmission timing is reset in a case where the response signal in response to the incoming call signal from the base station and addressed to the apparatus designated by an incoming call is not received.

* * * * *